April 10, 1951     W. D. CORNING     2,548,706
TRANSPARENT DISPLAY HOLDER
Filed June 13, 1947
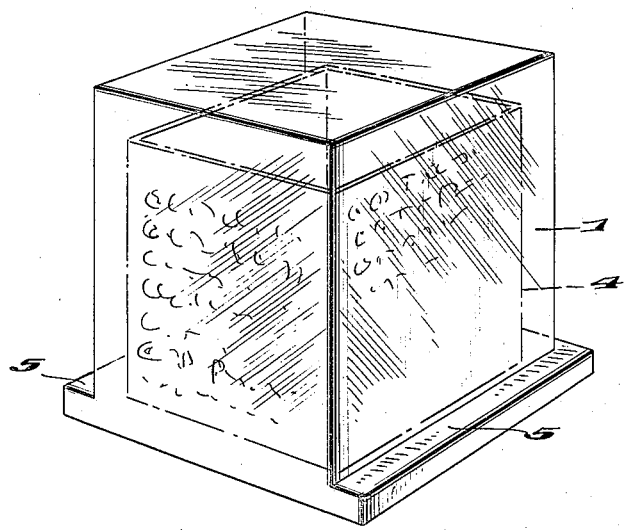
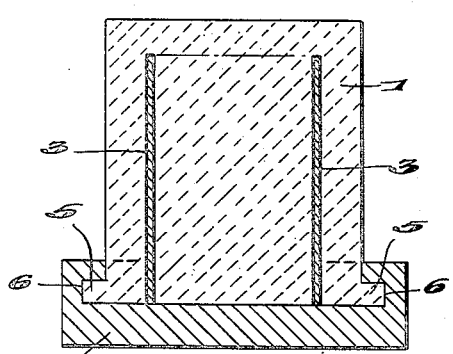
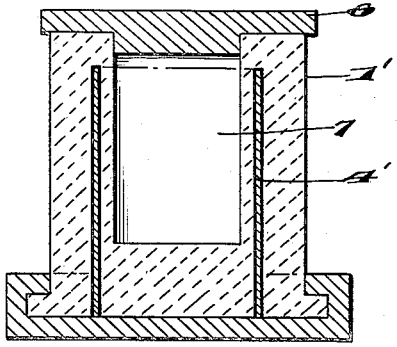
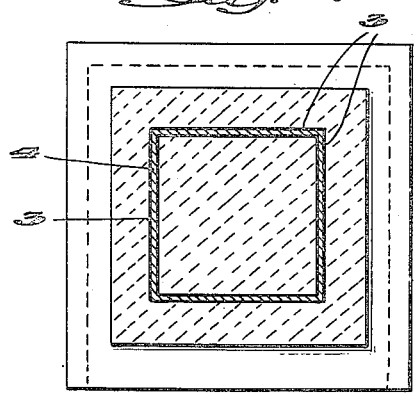
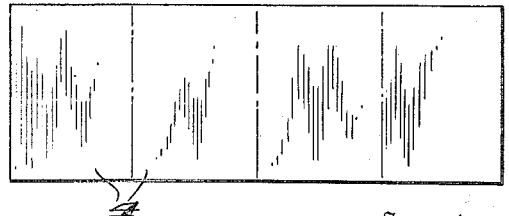
Inventor
WALTER D. CORNING,
Attorneys Patented Apr. 10, 1951

2,548,706

UNITED STATES PATENT OFFICE 2,548,706

TRANSPARENT DISPLAY HOLDER

Walter D. Corning, Knoxville, Tenn.

Application June 13, 1947, Serial No. 754,338

2 Claims. (Cl. 40—10)

This invention relates to improvements in transparent display holders, and, more particularly, to the construction of a paper weight which has provision for display on one or more of the sides thereof of an advertisement or other display material.

Most paper weights of the character used heretofore which have had provision for display surfaces, have exposed the surfaces through a transparent body, but the display material was secured on the bottom of the transparent body, so as to be visible only in an upward direction, when the paper weight is viewed directly from the top. When the paper weight is seated on a desk, or on papers or books in an elevated position, the display material or advertisement is not visible to a person in front of the desk who is not looking directly down upon the paper weight.

The object of this invention is to improve the construction of the paper weight, to provide for the exposing of a display surface laterally relative thereto, and at the same time to make it possible to replace when desired the display material or advertisement, whereby this is removably applied to the paper weight.

This object may be accomplished, according to one embodiment of the invention, by constructing a transparent body with a slot in the bottom thereof, which may extend continuously around the several sides of a polygonal body, adapted to receive display material mounted therein which is retained in place in the slot in the body and exposed to view laterally relative to the body. Where the display material extends annularly of the body, it is exposed to view from all sides. In either event, the display material may be viewed, even when the paper weight is in a position on eye level, without the necessity for the observer to view the object directly from above. At the same time, the display material may be inserted through the bottom of the body, without marring the sides of the body, thereby presenting an attractive display.

While any suitable means may be provided for retaining the display matter within the body, this preferably is detachably supported therein so as to change from time to time the character of the display, and to facilitate the mounting of the display in the body. This is desirable especially where a calendar surface is used for the display which should be changed from month to month or year to year. This is made possible, according to one embodiment of the invention, by detachably inserting the display material in the slot or slots provided in the bottom of the transparent body and retaining it in place by a base detachably mounted on the body.

The invention is illustrated in certain embodiments thereof, in the accompanying drawings in which:

Fig. 1 is a perspective view of the body portion and display of the paper weight;

Fig. 2 is a vertical cross section therethrough, showing the body and base in assembled relation;

Fig. 3 is a transverse section therethrough;

Fig. 4 is a vertical cross section showing a modified form of display device; and Fig. 5 is a plan view of a display blank that may be used in the device.

In the form of the invention shown in Figs. 1 to 3, the paper weight comprises a body generally as designated by the numeral 1, which is shown as supported upon a base 2. The body 1, preferably is of plastic material, although glass or any other suitable transparent material may be used as desired. The base 2 need not necessarily be transparent, but a resinous or non-transparent plastic, metal or other suitable material may be used for this base.

The body 1 is shown in Figs. 1 to 3, as substantially a cube, although any other suitable shape may be used as desired, preferably polygonal, so as to expose display surfaces in different directions. Each side of the body 1, has a slot 3 formed therein, spaced inwardly from the outer wall or face of the body, and extending upwardly from the bottom of the body, as shown in Fig. 2. The slots 3 are in communication with each other forming one continuous slot around the inside of the body 1 (Fig. 3). A display sheet 4 is adapted to be inserted into the slots 3, and preferably extends throughout the height of the slots. Where the several grooves 3 extend annularly of the body along the outer faces thereof, as shown in Fig. 3, a single strip of display material, as shown in Fig. 5, may be used to provide the several display areas. The advertisement or display material may be applied to the portion of the strip that is visible through the body 1, above the base 2. When such a strip is used, it may folded along the dotted lines illustrated in Fig. 5, to slip into the slots 3 formed in the body. The body 1 is preferably solid except for the slots 3.

The base 2 is detachably applied to the body 1 and serves to permit the insertion of the display material into the grooves when the base is removed, and thereafter to be applied in the position shown in Fig. 2, when it will retain the display material therein. This detachable mounting of the base on the body is made possible by a telescoping interfitting connection in the form illustrated. This connection includes ribs or tongues 5, extending along opposite sides of the body 1, and slidably received within grooves 6, formed as under-cut portions in opposite sides of the base 2. This forms a slidable interfitting tongue and groove connection between the body and the base which will retain the parts interconnected and hold the display material 4 within the grooves in the body, in display position. The ribs or tongues 5, may extend around three sides of the body, as shown in Figs. 1 and 3, to form a stop for the base to limit the sliding movement of the base in one direction relative to the body. The interfitting connection may be made sufficiently tight to retain the base in place theeron by a friction fit, or a suitable fastening provided to retain the base against accidental sliding off the body.

If desired, a recess may be provided in the top of the body, as indicated at 7 in Fig. 4, to serve as an inkwell, pin, or paper clip holder, or for other suitable purposes. In this form, the body 1' is also transparent and has the display material 4' surrounding the recess or receptacle 7, between the latter and the outer faces of the body. A cover is shown at 8, closing the top of the receptacle 7.

In addition to the use of slots in the bottom of the cube, there are other ways in which the advertisement may be inserted.

It will be evident that a display device thus may be made in very inexpensive fashion which may be used to display material in different directions laterally of the display device, preferably entirely around the circumference thereof, presenting an attractive display which serves also as a paper weight or for other utilitarian purpose. Furthermore, the display material may be changed from time to time, as often desired, merely by removing the base in its detachable connection with the body and withdrawing the display sheet from the recesses or grooves in the body.

While the invention has been illustrated and described in certain embodiments, it is recognized that variations and changes may be made therein, without departing from the invention, except as specified in the claims.

I claim:

1. A display device comprising an upright body of transparent material having a bottom face and surrounding side faces, said body having a slot therein extending upwardly from the bottom face into the body and spaced from at least one of the side faces in position to receive display material therein for viewing through said side face, and a base for the body having an interfitting conection therewith for retaining the display material in the body and separable therefrom for replacement of the material in the slot.

2. A paper weight comprising a body of transparent material and rectangular in shape having a bottom face with upstanding surrounding side faces, laterally projecting tongues extending transversely to the side faces, said body having slots extending upwardly thereinto from the bottom face thereof, said slots being parallel with the side faces of said body and in open communication with each other forming a continuous rectangular slot extending circumferentially within the body adapted to receive a sheet of display material therein, and a base for supporting the body having a recess therein adapted to receive a portion of said body, and upstanding side portions on said base having grooves therein slidably receiving the tongues on said body in a tongue and groove relation forming a slidable interfitting connection with the body to retain the display material in the slots.

WALTER D. CORNING.

REFERENCES CITED

The following references are of record in the file of this patent:

UNITED STATES PATENTS

| Number | Name | Date |
|---|---|---|
| 528,631 | Green | Nov. 6, 1894 |
| 531,924 | Gibson | Jan. 1, 1895 |
| 1,577,374 | Shelley | Mar. 16, 1926 |
| 2,000,419 | Sarber | May 7, 1935 |
| 2,175,481 | Padulo | Oct. 10, 1939 |
| 2,196,450 | Forgaard | Apr. 9, 1940 |
| 2,361,479 | Joffo | Oct. 31, 1944 |